United States Patent [19]

Pierce et al.

[11] Patent Number: 5,606,704
[45] Date of Patent: Feb. 25, 1997

[54] ACTIVE POWER DOWN FOR PC CARD I/O APPLICATIONS

[75] Inventors: Michael E. Pierce, Orangevale, Calif.; David C. Scheer, Boca Raton, Fla.

[73] Assignee: Intel Corporation, Santa Clara, Calif.

[21] Appl. No.: 330,250

[22] Filed: Oct. 26, 1994

[51] Int. Cl.[6] .................................................. G06F 1/32
[52] U.S. Cl. ............................................................ 395/750
[58] Field of Search ................................. 395/750, 550; 307/131

[56] References Cited

U.S. PATENT DOCUMENTS

| | | | |
|---|---|---|---|
| Re. 34,369 | 9/1993 | Darden et al. | 439/377 |
| 3,200,361 | 8/1965 | Schwartz et al. | 439/76 |
| 3,479,633 | 11/1969 | Winston et al. | 439/76 |
| 3,541,396 | 11/1970 | Cardwell et al. | 439/76 |
| 4,384,368 | 5/1983 | Rosenfeldt et al. | 359/154 |
| 4,388,671 | 6/1983 | Hall et al. | 361/682 |
| 4,399,487 | 8/1983 | Neumann | 361/727 |
| 4,491,981 | 1/1985 | Weller et al. | 359/154 |
| 4,530,069 | 7/1985 | Desrochers | 395/275 |
| 4,531,176 | 7/1985 | Beecher, II | 361/816 |
| 4,545,030 | 10/1985 | Kitchin | 395/750 |
| 4,695,925 | 9/1987 | Kodai et al. | 361/737 |
| 4,767,338 | 8/1988 | Dennis et al. | 439/455 |
| 4,780,570 | 10/1988 | Chuck | 175/35 GC |
| 4,780,791 | 10/1988 | Morita et al. | 361/684 |
| 4,811,165 | 3/1989 | Currier et al. | 361/716 |
| 4,821,146 | 4/1989 | Behrens et al. | 361/692 |
| 4,823,235 | 4/1989 | Suzuki et al. | 361/816 |
| 4,849,944 | 7/1989 | Matsushita | 361/212 |
| 4,872,091 | 10/1989 | Maniwa et al. | 361/684 |
| 4,889,495 | 12/1989 | Kimura | 439/60 |
| 4,905,124 | 2/1990 | Banjo et al. | 361/737 |
| 4,951,280 | 8/1990 | McCool et al. | 340/825.5 |
| 4,955,817 | 9/1990 | Sugai | 439/60 |
| 4,980,856 | 12/1990 | Ueno | 361/684 |
| 5,050,041 | 9/1991 | Shafi | 361/686 |
| 5,083,266 | 1/1992 | Watanabe | 395/275 |
| 5,121,500 | 6/1992 | Arlington et al. | 395/750 |
| 5,129,091 | 7/1992 | Yorimoto et al. | 395/750 |
| 5,183,404 | 2/1993 | Aldous et al. | 439/55 |
| 5,184,282 | 2/1993 | Kaneda et al. | 361/737 |

(List continued on next page.)

FOREIGN PATENT DOCUMENTS 417648  3/1991  European Pat. Off. .

OTHER PUBLICATIONS

No Author, *PCMCIA, Personal Computer Memory Card International Association PC Card Standard, Release 1.0,* Aug. 1990.

No Author, *PCMCIA, Personal Computer Memory Card International Association PC Card Standard, Release 2.0,* 3–13 through 3–26 (Sep. 1991).

No Author, *PCMCIA, Recommended Extensions, Release 1.0,* 1–3 through 1–8 (1992).

*Primary Examiner*—Ayaz R. Sheikh
*Attorney, Agent, or Firm*—Blakely, Sokoloff, Taylor & Zafman

[57] ABSTRACT

A system for controlling the power consumption of an add-in PC card operating within a host computer. The host computer includes a power supply that provides all power used by the PC card. The PC card includes communication registers required for communication between the host computer and the PC card. The PC card also includes a microcontroller connected to an I/O subsystem and a multi-pin I/O connector. A first side of the multi-pin I/O connector is connected to the I/O subsystem and a second side is connected to a source of I/O signals external to the host computer. An external register module is connected to the microcontroller and communicates with the host computer. The external register module contains the communication registers. A status detector located on the PC card detects whether the I/O subsystem is processing I/O information, and supplies a status signal indicative thereof. A power management module is also located on the PC card and is connected to the status connector. The power management module receives the status signal from the status detector and supplies one or more predetermined power levels as a result of the status signal.

18 Claims, 2 Drawing Sheets

U.S. PATENT DOCUMENTS

| | | | |
|---|---|---|---|
| 5,207,586 | 5/1993 | MacGregor et al. | 439/76.1 |
| 5,230,074 | 7/1993 | Canova, Jr. et al. | 395/750 |
| 5,272,477 | 12/1993 | Tashima et al. | 340/870.16 |
| 5,274,791 | 12/1993 | Bracking et al. | 395/750 |
| 5,285,057 | 2/1994 | Murohara | 235/492 |
| 5,296,692 | 3/1994 | Shino | 235/486 |
| 5,296,850 | 3/1994 | King | 340/825.49 |
| 5,300,874 | 4/1994 | Shimamoto et al. | 395/750 |
| 5,303,121 | 4/1994 | Thornberg | 361/760 |
| 5,313,364 | 5/1994 | Omori et al. | 361/737 |
| 5,343,319 | 8/1994 | Moore | 359/152 |
| 5,388,265 | 2/1995 | Volk | 395/750 |
| 5,394,552 | 2/1995 | Shirota | 395/750 |
| 5,396,636 | 3/1995 | Gallagher et al. | 395/750 |
| 5,404,541 | 4/1995 | Hirosawa et al. | 395/750 |
| 5,404,542 | 4/1995 | Cheung | 395/750 |
| 5,408,668 | 4/1995 | Tornai | 395/750 |
| 5,410,714 | 4/1995 | Yorimoto et al. | 395/750 |
| 5,451,933 | 9/1995 | Stricklin et al. | 340/825.06 |
| 5,463,261 | 10/1995 | Skarda et al. | 307/131 |
| 5,532,945 | 7/1996 | Robinson | 395/750 |

ACTIVE POWER DOWN FOR PC CARD I/O APPLICATIONS

CROSS-REFERENCE TO RELATED APPLICATIONS

Please refer to application Ser. No. 08/275,519 filed on Jul. 15, 1994 by MacGregor, et al, which is now U.S. Pat. No. 5,477,418 entitled IMPROVED I/O CONNECTOR FOR ADD IN PRINTED CIRCUIT CARDS FOR COMPUTER SYSTEMS

BACKGROUND OF THE INVENTION

1. Field of the Invention

The subject invention relates to add in printed circuit cards ("PC cards") that provide I/O functions for computer based systems. More particularly, the invention relates to detecting certain events external to the PC card and using the same to trigger a modification of the power dissipation state of the PC card.

2. Description of the Prior Art

The PCMCIA (Personal Computer Memory Card International Association) standard was developed for the purpose of providing user installed memory and I/O functions for small form factor digital computer systems. The standard specifies a card containing a printed circuit board. This product is usually referred to as a PC card. There are three PC card formats: Types I, II and III. The standard specifies the interface between the PC card and the host. The hardware portion of the interface consists of a 68 position socket on one end of the card. The 68 position socket mates with a 68 position plug mounted on a header which is in turn mounted to a mother board or daughter board which is located inside the host. In addition to the hardware interface, the PCMCIA standard also specifies the signal timing protocol and software interface format.

The original Type I PC cards were intended to provide additional memory. No interaction with external devices was contemplated. Later, a PCMCIA specification for a type II card was developed which provided for I/O functionality such as modems, facsimile, network interfaces, multi-media interface, sound cards, etc. In order to handle I/O functions, a second connector is located on the end of the card opposite the 68 position socket. The I/O connector may be attached to the PC card either before or after the PC card is inserted into the host.

In operation, a PC card is plugged into the host. Upon insertion of the PC card, the host is interrupted and interrogates the PC card to access information needed to correctly configure both itself and the PC card. This process is called configuration. The PCMCIA standard specifies that the host cannot have access to the I/O functions of the PC card prior the completion of the configuration process.

In full operation, a PC card draws as much as 100 milliamperes of current. This is a problem if the host is a portable since at this rate a PC card would drain its host's battery in as little as two hours. To compound matters, as PC cards have become more popular, users are choosing to store their PC cards in the host. Of course, there is no problem when the host itself is powered down. But once the host is powered up, the high power dissipation of the I/O card begins.

Recognition of the need for power management for PC cards is not new. Others have worked at reducing P/C card power consumption by using low power consuming components and power management schemes based on software control.

OBJECTS AND SUMMARY

It is an object of the invention to provide a power down system for add in PC cards that responds to an external event.

It is another object of the invention to provide a system for automatically switching between a full and a low power state in a PCMCIA card based upon the presence or absence of connection to an external cable required for the card's I/O function.

It is yet another object of the invention to provide a system that switches a PC card to a low power state upon disconnecting a I/O data cable to the outside world and at the same time maintains minimum functionality for the host to retain configuration.

It is another object of the invention to provide a system that allows a PC card to remain in a socket within the host for long periods of time without significant drain of the host's battery.

It is another object of the invention to provide a system that allows a PC card to be stored in the socket of the host even though the host may be powered up for portions of the time.

It is another object of the invention to provide an intuitive power control scheme that is easy for a user to operate.

It is yet another object of the invention to provide an automated power down system that is applicable to all PC cards providing I/O functionality.

It is another object of the invention to provide a low cost means for implementing an automated power down scheme for PC cards.

It is another object of the invention to provide a power-down system that is compatible with the PCMCIA specifications.

It is another object of the invention to provide a power-down system that is compatible with existing PCMCIA host hardware and software.

Finally it is an object of the invention to retain the host and PC card configuration for so long as the host is powered up without the need for removal and reinsertion of the PC card.

These and other objects of the invention may be achieved by a system for controlling the power consumption of an add in PC card operating within a host computer wherein the host computer includes a power supply that provides all power used by both the host and the PC card and wherein the PC card includes communication registers required for communication between the host computer and the PC card, a microcontroller connected to an I/O sub system and an I/O connector having a one side connected to the I/O sub system and the other side connected to a source of I/O signals external to the host computer. The control system includes an external register module connected to the microcontroller and communicating with the host computer. The external register module contain the communications registers. A detector located on the PC card supplies a signal indicating the status of the connection of the I/O sub module to external source of I/O signals. A power management module is located on the PC card and is connected to the detector and the power supply in the host. The power management module supplies one or more predetermined power levels to the microcontroller and I/O sub module as a result of the status of the connection between the I/O sub module and the external source of I/O signals. The external register module may be connected directly to the power supply in the host computer so that it always receives power for so long as the PC card is plugged into the host. The power management system cuts power to the I/O sub module upon receipt of a signal from the detector indicating that the connection of the I/O sub module to external source of I/O signals is broken. In like manner, the power management system cuts all power to the microcontroller upon receipt of a signal from the detector indicating that the connection of the I/O sub module to external source of I/O signals is broken. If the PC card contains one or more independent oscillators the power management module may control the supply of power to the oscillator upon receipt of a signal from the detector indicating that the connection of the I/O sub module to external source of I/O signals is broken. The detector may be a detector pin in the I/O connector. The PC the power management module may consist of a transistor connected between the power supply in the host and the I/O sub-system and microcontroller in the PC card. The gate of the transistor is connected to the detector pin in the I/O connector. The detector pin impresses a voltage on the gate of the transistor when the connector is closed or visa versa.

BRIEF DESCRIPTION OF THE DRAWING

A preferred embodiment will now be described in conjunction with the Drawing wherein.

DESCRIPTION OF A PREFERRED EMBODIMENT

To support the PCMCIA standard, the PC card must fully power up during the initial configuration phase. This phase starts when the host is interrupted by the PC card to let it know that it is present. Then the host reads certain information from the PC card, and based on this information configures both the host and the PC card. After configuration, the PC card need have little interaction with the host directly. Rather, it will deal mainly with the host based application software.

The invention uses a hardware signal to indicate the presence or absence of an external interface. After the host and PC card are configured, the PC card senses the hardware signal and enters the appropriate power state. The invention further modifies the circuitry of the PC card so that to the software residing in the host, the PC card appears to be powered up. This is accomplished according to the present invention by arranging to have all registers necessary for communication with the host active at all times. In addition, the contents of certain registers are modified to signal to the host that the PC card while configured is not ready to operate. This condition is also communicated to the user either by a message on the display or by a tone sounded through the host's speaker.

The invention uses logic and memory, preferably in the form of an ASIC, between the microprocessor and the host to implement all of the registers required by the PCMCIA standard. This is referred to as an external register module since normally, such registers would be implemented within the microcontroller. The external register module is designed from asynchronous low power logic and memory. This means that the external register module does not need an oscillator to run and therefore draws very little power. This is critical since power must be maintained to the external register module at all times that the PC card is plugged into the host.

According to present invention, the PC card is in its lowest power state when all functions not necessary to maintaining the illusion that the PC card is configured and operational are shut down. This includes all logic using clocks and oscillators. If the host seeks to use the PC card's I/O functionality while it is in a low power state, the card responds with a "not ready" message.

In operation, for example, if the I/O cable to the outside world, such as a LAN or telephone network, is removed, the PC card will sense this event and remove power to non-critical circuitry while maintaining the illusion to the host that the card is in an operational state.

Figure 1:
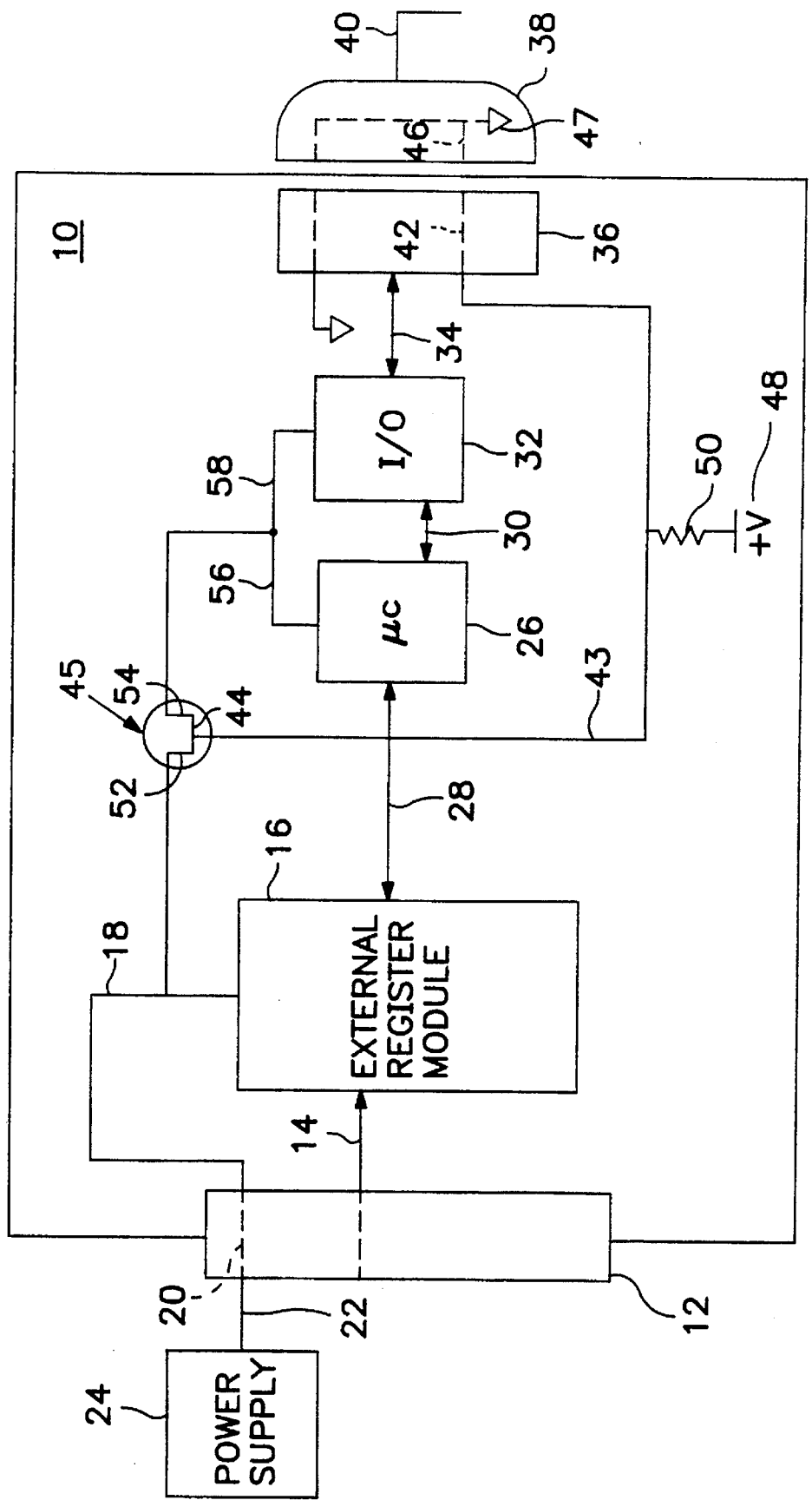
FIG. 1 is a block diagram of a preferred embodiment of the invention.

FIG. 1 is a block diagram of a basic form of the invention. Referring now to FIG. 1, PC card 10 has a 68 pin connector 12 that is the mechanical portion of the interface between a host computer, not shown, and PC card 10. The host computer is typically a small portable such as a laptop or notebook which is battery powered. Data, address and control signals pass from connector 12 along signal conductor 14 to external register module 16. External register module 16 consists of an array of SRAM and logic gates that implement all of the registers in the PC card specified by the PCMCIA standard. In a preferred embodiment, external register module 16 is implemented in an asynchronous CMOS ASIC. External register module 16 is tied through lead 18, pin 20 and lead 22 to power supply 24 in the host. The power supplied to external register module 16 is non interruptable for so long as card 10 remains in its socket in the host and for so long as the batteries in the host retain their charge.

From external register module 16, data is supplied to and from micro controller 26 via data path 28. Microcontroller 26 is typically synchronous which means that it requires a clock and therefore is a heavy power consumer. Microcontroller 26 communicates over data path 30 with I/O sub-system 32. The functionality of I/O sub-system 32 varies depending on the I/O application. For example, it would be a data pump in the case of a modem application. Or it would be a LAN communication chip set in the case of a LAN or a sound chip set in the case of a multimedia application. All such circuitry is usually synchronous and therefore a heavy power user. I/O sub-system 32 communicates with the outside world via data path 34 to I/O connector plug 36 which mates with I/O connector socket 38 and which is in turn connected to I/O cable 40. I/O cable 40 may be attached to a LAN, a telephone network, an antenna for cellular communication, to speakers, etc. The I/O connector consisting of plug 36 and socket 38 is multi-pin. In the present invention, one of the pins in plug 36, pin 42, is connected via lead 43 to gate 44 of FET 45. A mating pin 46 in I/O socket 38 is internally connected to ground 47. A power source 48 is connected through high impedance resistor 50 to lead 43. Power source 48 is connected by leads, not shown in the Figure, through connector 12 to power supply 24 in the host. Source 52 of FET 45 is connected via lead 54, pin 20 of connector 12 and lead 22 to power supply 24. Drain 54 of FET 45 is connected to microcontroller 26 via lead 56 and to I/O circuit 32 via lead 58. A typical FET useful for this purpose is Model FI9942DY, manufactured by Siliconix.

The system of FIG. 1 operates in the following manner. For so long as plug 36 and socket 38 are engaged, there is a direct connection from gate 44 of FET 45 to ground 47. Thus, the signal level on gate 44 of FET 45 is 0 volts and FET 45 is in the conducting state. In the conducting state, FET 45 is no more than a low value resistance in the path between power supply 24 and microcontroller 26 and I/O circuitry 32. In this condition, power is supplied to the microcontroller and the I/O circuitry. Power supply 48 is isolated from ground 47 by resistor 50. The current drain through resistor 50 to ground 47 is very low, of the order of microamperes, because of the high impedance of resistor 50.

When plug 36 and socket 38 are disengaged, gate 44 of FET 45 is no longer clamped to ground. Instead, a signal having the value of +V is impressed on gate 44. This causes FET 45 to be essentially infinite in impedance from source to drain which in turn isolates power supply 24 from microcontroller 26 and I/O sub system 32. In this state, PC card 10 draws as little as 1 milliamp of current. Thus the power consumption has been reduced by up to 100 times.

Figure 2:
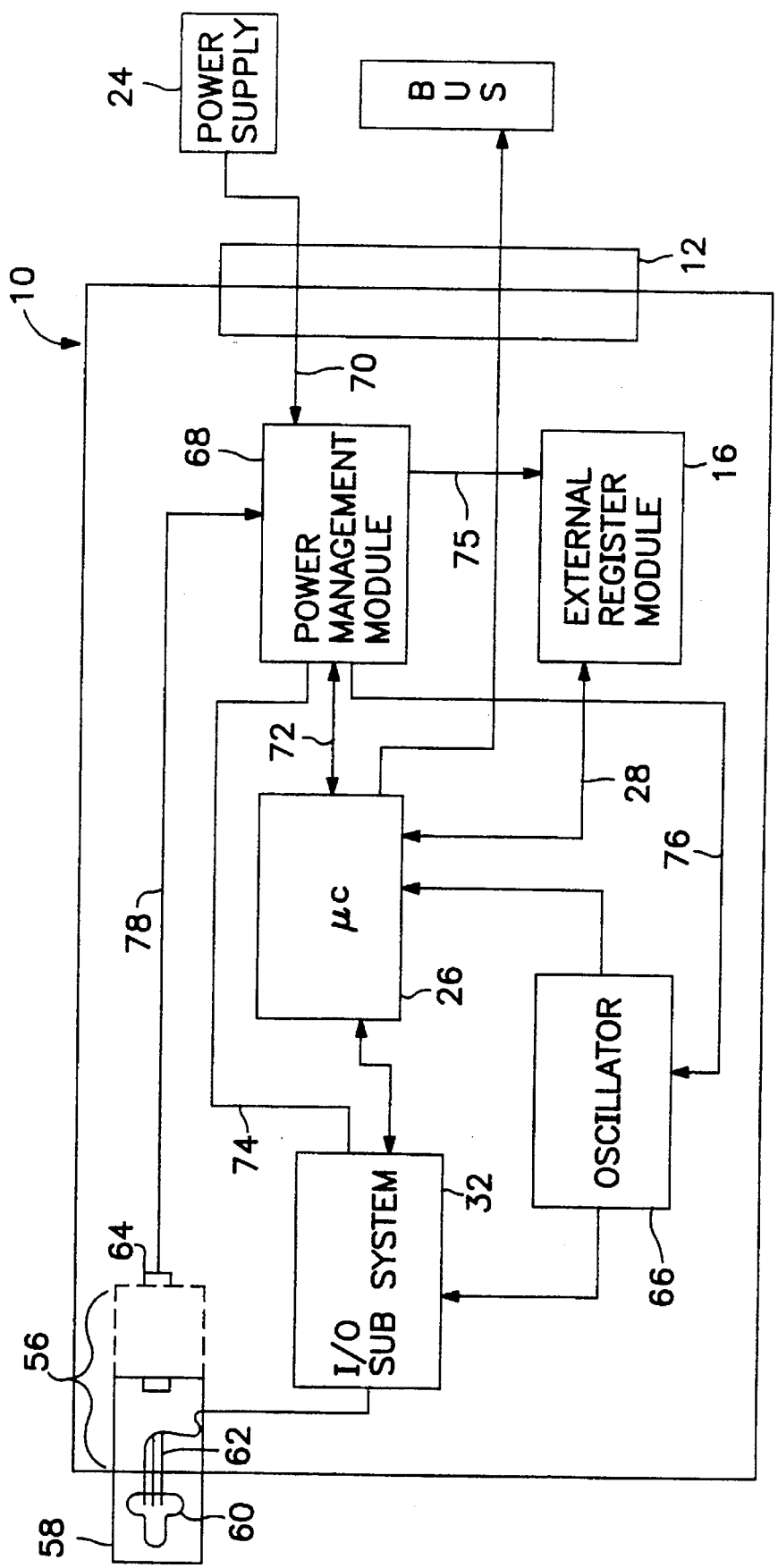
FIG. 2 is a block diagram of a second preferred embodiment of the invention.

FIG. 2 is a block diagram of an alternative embodiment of the present invention. The common reference numerals in FIGS. 1 and 2 refer to the same components. Referring now to FIG. 2, PC card 10 has a rectangular shaped cavity 56 into which a carriage 58 fits in a sliding relationship. Carriage 58 has a socket portion 60 designed to receive a RJ-11 or RJ-45 connector. Carriage 58 may slide in and out of cavity 56 and occupy at least two positions. In one position, substantially all of the carriage is within cavity 56. In this position, the I/O section of PC card 10 cannot be connected to the outside world and is therefore not being used. In a second position, carriage 58 is out of cavity 56 far enough to allow an RJ type connector to be inserted into socket 60. Electrical connection with the RJ type connector is made with contacts 62 which supply signals to I/O sub system 32. A switch 64 is positioned in the far end of cavity 56 and supplies a zero level or one level voltage indicating whether or not it is closed or open. Switch 64 may be optical, magnetic or electrical. The function of switch 64 is to detect when carriage 58 is fully inserted in cavity 56. A more detailed description of carriage 58 may be found in the copending application referenced in the first section of this application.

In addition to the sliding carriage connector, the embodiment of FIG. 2 differs from FIG. 1 in that oscillator 66 is separate from microcontroller 26 and I/O sub module 32. Also, a power management module 68 is connected to power supply 24 via lead 70. Power management module 68 is connected to microcontroller 26 via lead 72, to I/O system 32 via lead 74, to external register module 16 by lead 75 and to oscillator 66 via lead 76. Power management module 68 is connected to switch 64 by lead 78. Power management module 68 may consist of a multi-bit internal register, logic circuitry and circuitry for distributing power to various sections of card 10 based on the status of its internal register. One bit in the internal register of power management module 68 indicates the status of switch 64. The remaining bits indicate the power state of power management module 68. Microcontroller 26 may program the power state of power management module 68 by writing to the internal register of power management module 68.

In operation, when carriage 58 is extended outwardly as shown in FIG. 2, it is possible to insert a RJ type plug into socket 60 and connect card 10 to the outside world. In the outwardly extended position, switch 64 is open. A signal indicating the position of carriage 58 is sent via lead 78 to power management module 68. When the signal on line 78 indicates that carriage is in the outwardly extended position, the status bit in the internal register in power management module 68 is set and an interrupt is sent from power management module 68 to micro controller 26 requesting that the micro controller read its internal register and determine if its power state settings are as desired by the micro controller. Micro controller 26 responds to the interrupt by reading the internal register in power management module 68. If the power state is correct, no action is taken by microcontroller 26. If however the power state is incorrect, microcontroller 26 writes the proper state to the internal register of power management module 68.

Power management module 68 distributes power according to the settings in its internal register. Examples of such states are: (1) turn off all power, (2) turn on all power, (3) turn off/on power to certain specified sections of card 10, (4) keep all power on and do not send interrupts to the micro controller.

The present invention has described with reference to specific embodiments. No doubt one skilled in the art could conceive of many variations. However, all such variations are included within the intended scope of the present invention as defined by the following claims.

What is claimed is:

1. A system for controlling the power consumption of a PC card coupled to a host computer providing all power to said PC card, wherein said PC card includes a microcontroller connected to an I/O sub system and an I/O connector having a first side connected to said I/O sub system and a second side connected to a source of I/O signals external to said host computer, said system comprising:

an external register module connected to said microcontroller and communicating with said host computer said external register module indicating the status of said PC card to said host computer;

a status detector located on said PC card and adapted to detect whether said I/O sub system is processing I/O information and supplying a status signal indicative thereof; and a power management module connected to said status detector for receiving said status signal, said power management module controlling, application of power to said I/O sub system in response to said status signal said power management module supplying power to said external register module regardless of whether said I/O sub system is processing I/O information.

2. The system of claim 1 wherein said status detector is a switch operatively connected to said I/O connector and adapted to provide a signal indicative the status of said switch.

3. The system of claim 1 wherein said external register module is connected directly to said power supply in said host computer.

4. The system of claim 1 wherein said power management module cuts all power to said I/O sub-system upon receipt of a signal from said status detector indicating that said I/O sub-system is not coupled to said external source of I/O signals.

5. The system of claim 1 wherein said power management module cuts all power to said microcontroller upon receipt of a signal from said status detector indicating that said I/O sub-system is not coupled to said external source of I/O signals.

6. The system of claim 1 wherein said PC card includes at least one oscillator receiving power from said power management module, wherein said power management module cuts all power to said oscillator upon receipt of a signal from said status detector indicating that said I/O sub-system is not coupled to said external source of I/O signals.

7. The system of claim 1 wherein said PC card comprises:

one or more detector pins in said first side of said I/O connector connected to said power management module;

a resistor having a first and second electrical side; said first side of said resistor being connected to said one or more pins in said first side of said I/O connector;

a source of voltage connected to said second side of said resistor; and a ground connected to one or more detector pins in said second side of said I/O connector.

8. The system of claim 7 wherein said power management module comprises a register communicating with said microcontroller and said status detector, said power management module further including logic circuitry adapted to supply power to said microcontroller and said I/O sub-system determined by the status of said register.

9. The system of claim 7 wherein said power management module comprises a transistor having a first terminal, a second terminal and a control terminal, said control terminal being connected to said first electrical side of said resistor, said first terminal being connected to said power supply in said host computer, and said second terminal being connected to said microcontroller.

10. The system of claim 8 wherein said second terminal of said transistor is connected to said I/O sub system.

11. The system of claim 9 wherein said transistor is a field effect transistor.

12. A PC card for supplying communications functions between a host computer and a network wherein said host computer includes a power supply that provides all power used by said PC card, said PC card comprising:

a first connector disposed on said PC card;

a carriage having a socket portion, said carriage slidably mounted in a cavity in said PC card and movable between a first position wherein substantially all of said carriage is within said cavity and a second position wherein said socket portion of said carriage is outside said cavity;

a microcontroller disposed on said PC card and communicating through said first connector with said host computer;

an i/O sub system disposed on said PC card and connected to said microcontroller, said I/O subsystem communicating with the socket portion of the carriage;

an external register module disposed on said PC card and connected to said microcontroller and communicating with said host computer, said external register module indicating the status of said PC card to said host computer;

a switch located adjacent said cavity for detecting the presence or absence of said carriage within said cavity and generating a status signal indicative thereof; and a power management module disposed on said PC card, said power management module connected through said first connector to a source of power in said host computer and coupled to said switch for receiving said status signal, said power management module controlling application of power to said microcontroller and said I/O sub-system in response to said status signal.

13. The system of claim 12 wherein said external register module is connected directly to said power supply in said host computer.

14. The system of claim 13 wherein said power management module comprises a register communicating with said microcontroller and said switch, said power management module further including logic circuitry adapted to supply power to said microcontroller and said I/O sub-system determined by the status of said register.

15. The system of claim 12 wherein said power management module cuts all power to said I/O sub-system upon receipt of a signal from said status detector indicating that said I/O subsystem is not coupled to an external source of I/O signals.

16. The system of claim 12 wherein said power management module cuts all power to said microcontroller upon receipt of a signal from said status detector indicating that said I/O subsystem is not coupled to an external source of I/O signals.

17. The system of claim 12 wherein said PC card includes at least one oscillator and wherein said power management module supplies power to said oscillator and wherein said power management system cuts all power to said oscillator upon receipt of a signal from said switch indicating that said carriage is within said cavity.

18. The system of claim 12 wherein said host computer is battery powered.

\* \* \* \* \*

UNITED STATES PATENT AND TRADEMARK OFFICE
CERTIFICATE OF CORRECTION

| | | |
|---|---|---|
| PATENT NO. | : | 5,606,704 |
| DATED | : | February 25, 1997 |
| INVENTOR(S) | : | Pierce et al. |

It is certified that error appears in the above-identified patent and that said Letters Patent is hereby corrected as shown below:

In column 7 at line 45 delete "i/O" and insert --I/O--

Signed and Sealed this

First Day of July, 1997

*Attest:*

*Attesting Officer*

BRUCE LEHMAN

*Commissioner of Patents and Trademarks*